(12) United States Patent
Cai et al.

(10) Patent No.: US 10,659,436 B2
(45) Date of Patent: May 19, 2020

(54) METHOD AND SYSTEM FOR DATA PROCESSING

(71) Applicant: Huizhou University, Guangdong (CN)

(72) Inventors: Zhaoquan Cai, Huizhou (CN); Song Hu, Huizhou (CN); Hui Hu, Huizhou (CN); Yingxue Cai, Huizhou (CN); Jia Chen, Huizhou (CN)

(73) Assignee: HUIZHOU UNIVERSITY, Huizhou, Guangdong (CN)

( * ) Notice: Subject to any disclaimer, the term of this patent is extended or adjusted under 35 U.S.C. 154(b) by 295 days.

(21) Appl. No.: 15/694,414

(22) Filed: Sep. 1, 2017

(65) Prior Publication Data

US 2018/0375835 A1 Dec. 27, 2018

(30) Foreign Application Priority Data

Jun. 22, 2017 (CN) .......................... 2017 1 0484110

(51) Int. Cl.
*H04L 29/06* (2006.01)
*H04L 12/58* (2006.01)
*H04L 9/14* (2006.01)

(52) U.S. Cl.
CPC .......... *H04L 63/0428* (2013.01); *H04L 9/14* (2013.01); *H04L 51/08* (2013.01); *H04L 69/04* (2013.01); *H04L 2463/121* (2013.01)

(58) Field of Classification Search
CPC ....... H04L 63/0428; H04L 51/08; H04L 9/14; H04L 69/04; H04L 2463/121; H04L 51/22
See application file for complete search history.

(56) References Cited

U.S. PATENT DOCUMENTS 7,254,712 B2  8/2007  Godfrey et al.
9,098,721 B2 * 8/2015  Peterson ............. G06F 21/6218
(Continued)

FOREIGN PATENT DOCUMENTS

CN     103248553     8/2013
CN     103268452     8/2013
(Continued)

OTHER PUBLICATIONS

1st Office Action from SIPO for Chinese Patent Application No. 2017104841103.
(Continued)

*Primary Examiner* — Farid Homayounmehr
*Assistant Examiner* — Suman Debnath
(74) *Attorney, Agent, or Firm* — Dragon Sun Law Firm, PC; Jinggao Li, Esq.

(57) ABSTRACT

A method for data processing comprises: S100. if a to-be-sent email needs to be saved cryptographically or sent cryptographically, automatically converting a main body of the mail into an html file, the html file including an attachment link for linking a mail attachment; S200. compressing a filename of the html file and a filename of the mail attachment into a new html filename and a new mail attachment name using a first open source algorithm based on a first password preset between a sender and a recipient, thereby obtaining a renamed html file and a renamed mail attachment; S300. compressing the renamed html and the renamed mail attachment using a second open source algorithm based on a second password preset between the sender and the recipient, thereby obtaining a compressed file; and S400. releasing a memory space and/or a hard disk space occupied by the to-be-sent mail, encrypting the to-be-sent mail and then saving it to a draft box or sending it in a manner in which a mail has a null mail body and the (Continued)

compressed file is used as the mail attachment. In this way, a method and a system for data processing are implemented, which utilize open source algorithms and have a wider applicability.

8 Claims, 1 Drawing Sheet

(56) References Cited

U.S. PATENT DOCUMENTS

| | | | | |
|---|---|---|---|---|
| 2004/0177260 A1* | 9/2004 | Gilfix | ................... | G06F 21/52 |
| | | | | 713/193 |
| 2007/0112926 A1* | 5/2007 | Brett | ................... | G06Q 10/109 |
| | | | | 709/206 |
| 2008/0282079 A1* | 11/2008 | Yaghmour | ............... | H04L 9/00 |
| | | | | 713/150 |

FOREIGN PATENT DOCUMENTS

| | | |
|---|---|---|
| CN | 105743884 | 7/2016 |
| CN | 106656739 | 5/2017 |
| CN | 106713109 | 5/2017 |

OTHER PUBLICATIONS

2nd Office Action from SIPO for Chinese Patent Application No. 2017104841103.
Search Report for Chinese Patent Application No. 2017104841103.

* cited by examiner

METHOD AND SYSTEM FOR DATA PROCESSING

FIELD OF THE INVENTION

The present disclosure relates to the field of computers, and more particularly to a method and a system for data processing.

BACKGROUND OF THE INVENTION

In the prior art, it is impossible to encrypt a mail draft or send a mail in a friendly encrypted manner. With cryptographically sending a mail as an example, in the prior art, the mail is always encrypted by loading a digital certificate at various kinds of mail clients or is encrypted using a more complex OpenPGP or GnuPG mechanism which is not so friendly for user interaction.

SUMMARY OF THE INVENTION

In order to solve the problems above, the present disclosure discloses a method and a system for data processing, wherein:

a method for data processing comprises steps of:

S100. if a to-be-sent email needs to be saved cryptographically or sent cryptographically, automatically converting a main body of the mail into an html file, the html file including an attachment link for linking to a mail attachment;

S200. compressing a filename of the html file and a filename of the mail attachment into a new html filename and a new mail attachment name using a first open source algorithm based on a first password preset between a sender and a recipient, thereby obtaining a renamed html file and a renamed mail attachment;

S300. compressing the renamed html and the renamed mail attachment using a second open source algorithm based on a second password preset between the sender and the recipient, thereby obtaining a compressed file; and S400. releasing a memory space and/or a hard disk space occupied by the to-be-sent mail, encrypting the to-be-sent mail and then saving it to a draft box or sending it in a manner in which a mail has a null mail body and the compressed file is used as the mail attachment.

Further, the present disclosure discloses a system for data processing comprising:

a converting unit configured to, when a to-be-sent email needs to be saved cryptographically or sent cryptographically, automatically convert a main body of the mail into an html file, the html file including an attachment link for linking to a mail attachment;

a renaming unit configured to compress a filename of the html file and a filename of the mail attachment into a new html filename and a new mail attachment name by using a first open source algorithm based on a first password preset between a sender and a recipient, thereby obtaining a renamed html file and a renamed mail attachment;

a file compressing unit configured to compress the renamed html and the renamed mail attachment by using a second open source algorithm based on a second password preset between the sender and the recipient, thereby obtaining a compressed file; and a releasing unit configured to release a memory space and/or a hard disk space occupied by the to-be-sent mail, encrypt the to-be-sent mail and then save it to a draft box or sending it in a manner in which a mail having a null mail body and the compressed file as the mail attachment Through the solution above, in the aspect of mail data, the present disclosure may provide a method and a system for data processing which utilizes open source algorithms and has a wider applicability.

BRIEF DESCRIPTION OF THE ACCOMPANYING DRAWINGS

DETAILED DESCRIPTION OF THE PREFERRED EMBODIMENTS

To enable those skilled in the art to understand the technical solution disclosed by the present disclosure, the technical solutions of various embodiments will be described in conjunction with the embodiments and relevant drawings. The embodiments as described are only part of the embodiments of the present disclosure, not all of them. The terms "first" and "second" used herein are for distinguishing different objects, not for describing specific sequences. In addition, "comprising" and "including" as well as any of their variants are intended for covering and non-exclusively including. For example, a process, a method, a system, a product, or an apparatus, which includes a series of steps or units, is not limited to the listed steps or units, but may optionally further include the steps or units that are not listed, or optionally may further include other steps or units inherent in that process, method, system, product or apparatus.

The "embodiment" mentioned herein means that a specific feature, a structure or a characteristic described in conjunction with the embodiment may be included in at least one embodiment of the present disclosure. This expression appearing in various positions in the specification does not necessarily refer to a same embodiment, or an independent or alternative embodiment mutually exclusive with a further embodiment. Those skilled in the art may understand that an embodiment described herein may be combined with other embodiments.

Figure 1:
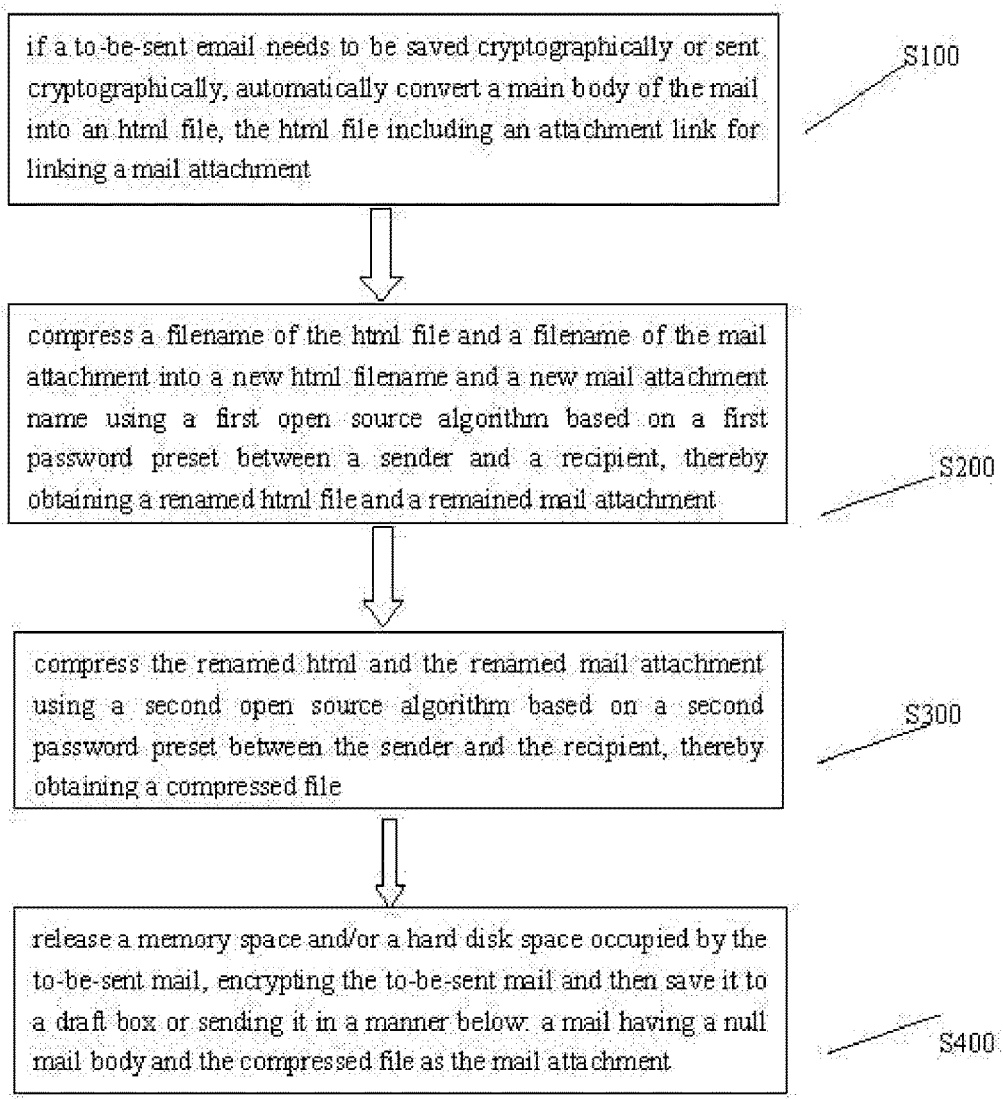
FIG. 1 is a schematic diagram of a method according to an embodiment of the present disclosure.

Referring to FIG. 1, an embodiment provides a method for data processing comprising:

S100. if a to-be-sent email needs to be saved cryptographically or sent cryptographically, automatically converting a main body of the mail into an html file, the html file including an attachment link for linking to a mail attachment;

S200. compressing a filename of the html file and a filename of the mail attachment into a new html filename and a new mail attachment name by using a first open source algorithm based on a first password preset between a sender and a recipient, thereby obtaining a renamed html file and a renamed mail attachment;

S300. compressing the renamed html and the renamed mail attachment by using a second open source algorithm based on a second password preset between the sender and the recipient, thereby obtaining a compressed file; and S400. releasing a memory space and/or a hard disk space occupied by the to-be-sent mail, encrypting the to-be-sent mail and then saving it to a draft box or sending it in a manner in which a mail having a null mail body and the compressed file as the mail attachment.

Regarding the embodiment above, it may solve a technical problem in the prior art that a mail draft cannot be encrypted or a mail cannot be sent in a new encryption manner. With cryptographically sending a mail as an example in the prior art, the mail was always encrypted by loading a digital certificate at various mail clients or encrypted by using a more complex OpenPGP or GnuPG mechanism.

Either for encrypting when saving a mail or for sending an encrypted mail, the embodiment processes a mail as an encrypted compressed file, the mail body is null when sending the mail, and the real body and the attachment are cryptographically compressed into a compressed file. Meanwhile, as for the html filename corresponding to the encrypted body and the original mail attachment, even if other people illegally access the compressed file, it is hard to determine some information from the filename. It is most critical that no digital certificate is used in the embodiment, and it is only required that the sender and the recipient can obtain the preset first password and the second password. Furthermore, the embodiment is based on the existing open source algorithms, and particularly the open source algorithms for compression.

Further, to send the to-be-sent mail, the encrypted mail is sent to the recipient. In the case of sending in failure, a draft of the to-be-sent mail is stored in the to-be-sent mailbox in a form of the encrypted mail. In the case of sending in success, the to-be-sent mail is stored in a sent mailbox in a form of the encrypted mail.

It should be understood that releasing of the memory space and/or hard disk space occupied by the to-be-sent mail is to enhance data security as much as possible, and to prevent some illegal software from hacking in the memory or searching data traces on a hard disk space. Naturally, it is safer to release relevant memory space and hard disk space simultaneously, or even format the hard disk area defined by an initial address of the corresponding hard disk space for multiple times.

Further, in step S100, a subject of the mail may be used as a filename of the html file. The subject of the mail may be used as a first line of content in the html file. In this way, when the mail is saved or sent, not only the mail body is empty, the subject of the mail is also null, because the subject of the mail has been recorded in the html file, further enhancing the mail security.

In another embodiment, the first password and the second password are same or different, and the first open source algorithm and the second open source algorithm are same or different. It should be understood that if the passwords are different, the security can be further enhanced, but user interaction will be affected. Therefore, the first password is preferably same as the second password. Besides, security may also be further enhanced with different open source algorithms. Because the open source algorithms are always designed during the process of backstage operation, they are hardly perceivable to users, which thus substantially involves no user interaction. It needs to be noted that the passwords may be pre-agreed through a further communication approach.

In another embodiment, the first open source algorithm and the second open source algorithm are selected from the following algorithms: bzip2 and lzma. Of course, other open source algorithms may also be selected, which will not be listed one by one. It should be understood that the open source algorithm used by the present disclosure mainly considers an open source compression algorithm, thereby obtaining the compressed file and the encrypted filename, wherein if the first open source algorithm selects the open source compression algorithm, encryption of the filename corresponds to compressing the filename.

In another embodiment, the first password and the second password are same and associated with the recipient and the sender. For example, if the full name of the sender is a, the full name of the recipient is b, then the first password and the second password may be ab, or acbc, or even cd (note: c and a are spaced by one letter, and d and b are also spaced by one letter). Regarding this embodiment, it is intended that each group of sender and recipient has its own unique password, while the other group of sender and recipient has a password unique thereto. Optionally, the full names of relevant sender and recipient may be replaced by the full name of the mailbox of the sender (e.g., a@b.com) and the full name of the mailbox of the recipient (e.g., b@d.net).

In another embodiment, the first password and the second password are different, but both are associated with the sender and the recipient, as well as associated with a timestamp. In this way, the full names or mailboxes of the sender and the recipient may be referred to as a character string (e.g., expressing the character string into a@c.com_and_b@d.net) or one ID (e.g., naming the ID as acbd), and a dynamic password associated with the timestamp for the character string or ID is generated, e.g., a mechanism like Google Authenticator; in this way, the technical solution of the present disclosure can be implemented at a cloud: upon each encryption, the character string or ID is employed to perform encrypted compression with the password associated with the current clock or timestamp under an offline Google Authenticator mechanism, while when the counterpart is decrypting, the character string or ID is decrypted using a dynamic password prompted by the offline Google Authenticator. As to the server at the cloud, the password of the compressed file is constantly updated according to the same Google Authenticator mechanism at the cloud: decompressing, and re-encrypting the compression with a new password. Wherein, the offline Google Authenticator includes a corresponding identity authenticator App under an Android or iOS operation system.

It should be understood that if the user wishes to further make a secondary amendment based on the draft or the sent mail after the draft is saved or sent successfully, it is only required to perform decompression and decryption following the above encryption and compression approach. More preferably, the html file and the attachment may be directly recovered into an undecrypted mail body and the corresponding attachment for reedition.

Figure 2:
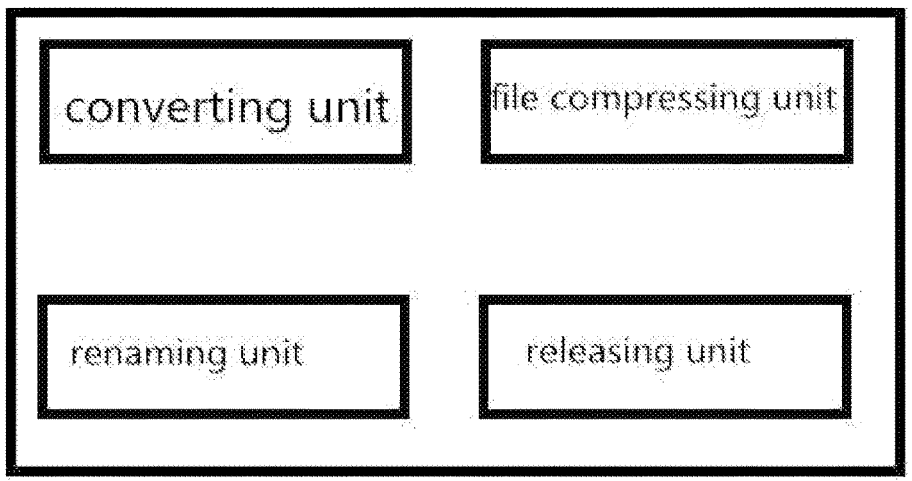
FIG. 2 is a schematic diagram of a system according to an embodiment of the present disclosure.

Similar to the method above, referring to FIG. 2, a system for data processing is provided according to another embodiment, comprising:

a converting unit configured to, when a to-be-sent email needs to be saved cryptographically or sent cryptographically, automatically convert a main body of the mail into an html file, the html file including an attachment link for linking a mail attachment;

a renaming unit configured to compress a filename of the html file and a filename of the mail attachment into a new html filename and a new mail attachment name using a first open source algorithm based on a first password preset between a sender and a recipient, thereby obtaining a renamed html file and a renamed mail attachment;

a file compressing unit configured to compress the renamed html and the renamed mail attachment using a second open source algorithm based on a second password preset between the sender and the recipient, thereby obtaining a compressed file; and a releasing unit configured to release a memory space and/or a hard disk space occupied by the to-be-sent mail, encrypt the to-be-sent mail and then save it to a draft box or sending it in a manner in which a mail has a null mail body and the compressed file is used as the mail attachment With reference to relevant embodiments of the method above, it should be understood that the embodiment of the system reveals a corresponding system-level technical solution through specific functional units.

If the to-be-sent mail is sent, the encrypted mail will be sent to the recipient. In the case of sending in failure, the draft of the to-be-sent mail is stored in the to-be-sent mailbox in the form of an encrypted mail. In the case of sending in success, the to-be-sent mail is stored in the sent mailbox in the form of the encrypted mail.

Similarly, in another embodiment, the first password and the second password are same or different; the first open source algorithm and the second open source algorithm are same or different.

Similarly, in a further embodiment, the first password and the second password are same and associated with the sender and the recipient.

Similarly, in a still further embodiment, the first open source algorithm and the second open source algorithm are selected from the following algorithms: bzip2 and lzma.

Similarly, in another embodiment, the first password and the second password are different, but both associated with the sender and the recipient, as well as associated with a timestamp.

The steps in the embodiment method of the present disclosure may be subjected to sequence adjusting, merging and deleting according to actual needs.

The units in the embodiment system of the present disclosure may be merged, partitioned, deleted, and reduced according to actual needs. It needs to be noted that for the various method embodiments described above, they are all described as a combination of a series of actions. However, those skilled in the art should know that the present invention is not limited by the described sequence of actions, because some steps may be performed in other sequence or simultaneously according to the present disclosure. Secondly, those skilled in the art should also know that the embodiments described in the specification belong to preferred embodiments, and the involved actions, modules, and units are not essential to the present disclosure.

In the embodiments above, the various embodiments are described with different focuses, and a part that is not detailed in one embodiment may refer to relevant depictions in other embodiments.

In the several embodiments provided by the present disclosure, it should be understood that the disclosed system may be implemented in other manners. For example, the system embodiment described above is only schematic, e.g., partitioning of the units, which is only a logic function partition; in practice, there may exist other partitioning manners upon implementation, e.g., a plurality of units or assemblies may be combined or may be integrated into another system, or some features may be omitted or not executed. Further, a coupling, or direct coupling, or communication connection between respective units or assemblies may be an indirect coupling or communication connection between modules or units via some interfaces, or may be electrical or other manners of connection.

Units described as separate components may be or may not be physically separated, or may be located at one place or distributed on a plurality of network units. Some or all of the units therein may be selected according to the actual needs to achieve the objective of the present embodiment.

Additionally, various functional units in various embodiments of the present disclosure may be integrated into one processing unit, or may be existent separately as individual units; or two or more units may be integrated into one unit. The integrated unit may be implemented in hardware form or implemented in software functional units.

The integrated unit may be stored in one computer readable storage medium if it is implemented in the form of a software function unit and sold or used as an independent product. Based on such understanding, the technical solution of the present disclosure, essentially the part contributing to the prior art, or all or part of the technical solution, may be embodied in a software product form. The computer software product is stored in a storage medium, including a plurality of instructions for enabling a computer device (which may be a smart phone, a personal digital assistant, a wearable device, a laptop computer, a tablet computer) to execute all or part of the steps of the method in various embodiments of the present disclosure. However, the aforementioned storage mediums include various kinds of mediums that may store program code, such as a USB flash disk, a ROM (a Read-Only Memory), a RAM (Random Access Memory), a mobile hard disk, a magnetic disk or an optical disk.

As mentioned above, the embodiments are only used for illustrating, not for limiting the technical solution of the present disclosure. Although the present disclosure has been illustrated in detail with reference to the aforementioned embodiments, those skilled in the art may modify the technical solutions as disclosed in the various embodiments or equivalently replace some technical features thereof; while these modifications or substitutions will not cause the substance of the corresponding technical solution to depart from the scope of the technical solutions in various embodiments of the present disclosure.

The invention claimed is:

1. A method for data processing comprises steps of:
   if a to-be-sent email needs to be saved cryptographically or sent cryptographically, automatically converting a main body of the mail into an html file, the html file including an attachment link for linking a mail attachment of the to-be-sent email;
   performing a first compression to compress a filename of the html file and a filename of the mail attachment into a new html filename and a new mail attachment name using a first open source algorithm based on a first password preset between a sender and a recipient, thereby obtaining a renamed html file and a renamed mail attachment;
   performing a second compression to compress the renamed html file and the renamed mail attachment using a second open source algorithm based on a second password preset between the sender and the recipient, thereby obtaining a compressed file; and
   releasing a memory space and/or a hard disk space occupied by the to-be-sent mail, sending the compressed file in a manner in which a mail has a null mail body and the compressed file is used as the mail attachment, wherein when the first password and the second password are same, the first open source algorithm and the second open source algorithm are different; and when the first password and the second password are different, the first open source algorithm and the second open source algorithm are same or different.

2. The method according to claim 1, wherein the first password and the second password are same and associated with the recipient and the sender.

3. The method according to claim 1, wherein the first open source algorithm and the second open source algorithm are selected from the following algorithms: bzip2 and lzma and the second open source algorithm is different from the first open source algorithm.

4. The method according to claim 1, wherein the first password and the second password are different, but both are associated with the sender and the recipient, as well as associated with a timestamp.

5. A system for data processing, comprising:
a hardware processor, configured to:
when a to-be-sent email needs to be saved cryptographically or sent cryptographically, automatically convert a main body of the mail into an html file, the html file including an attachment link for linking a mail attachment;
perform a first compression to compress a filename of the html file and a filename of the mail attachment into a new html filename and a new mail attachment name using a first open source algorithm based on a first password preset between a sender and a recipient, thereby obtaining a renamed html file and a renamed mail attachment;
perform a second compression to compress the renamed html file and the renamed mail attachment using a second open source algorithm based on a second password preset between the sender and the recipient, thereby obtaining a compressed file; and
release a memory space and/or a hard disk space occupied by the to-be-sent mail, and then send the compressed filed in a manner in which a mail has a null mail body and the compressed file is used as the mail attachment, wherein when the first password and the second password are same, the first open source algorithm and the second open source algorithm are different; and when the first password and the second password are different, the first open source algorithm and the second open source algorithm are same or different.

6. The system according to claim 5, wherein the first password and the second password are same and associated with the recipient and the sender.

7. The system according to claim 5, wherein the first open source algorithm and the second open source algorithm are selected from the following algorithms: bzip2 and lzma and the second open source algorithm is different from the first open source algorithm.

8. The system according to claim 5, wherein the first password and the second password are different, but both are associated with the sender and the recipient, as well as associated with a timestamp.

* * * * *